United States Patent
James et al.

(10) Patent No.: US 8,470,497 B2
(45) Date of Patent: Jun. 25, 2013

(54) MANUFACTURE OF MEMBRANE ELECTRODE ASSEMBLY WITH EDGE PROTECTION FOR PEM FUEL CELLS

(75) Inventors: Ronald L. James, North Chili, NY (US); Seth D. Valentine, Edmond, OK (US); James Liestra, Penfield, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2123 days.

(21) Appl. No.: 11/594,600

(22) Filed: Nov. 8, 2006

(65) Prior Publication Data

US 2008/0105354 A1      May 8, 2008

(51) Int. Cl.
*H01M 8/00* (2006.01)
(52) U.S. Cl.
USPC ............................ 429/535; 429/483; 429/508
(58) Field of Classification Search
USPC ............................... 429/34, 36, 535, 483, 508
See application file for complete search history.

(56) References Cited

U.S. PATENT DOCUMENTS

| | | | |
|---|---|---|---|
| 5,129,933 A | 7/1992 | Muragishi | |
| 5,284,718 A * | 2/1994 | Chow et al. | 429/26 |
| 7,544,219 B2 | 6/2009 | Song | |
| 2003/0114297 A1 * | 6/2003 | Shinn et al. | 502/159 |
| 2005/0016678 A1 | 1/2005 | Kurosawa | |
| 2006/0046128 A1 | 3/2006 | Rock | |
| 2006/0078781 A1 | 4/2006 | Stegink | |

FOREIGN PATENT DOCUMENTS

| | | |
|---|---|---|
| JP | 09-115346 A | 5/1997 |
| JP | 11-255354 A | 9/1999 |
| JP | 2005-2274 A | 1/2005 |

* cited by examiner

*Primary Examiner* — Zachary Best
(74) *Attorney, Agent, or Firm* — John A. Miller; Miller IP Group, PLC

(57) ABSTRACT

Methods for attaching a subgasket to an ionomer membrane, wherein the methods provide for the precise location of the subgasket relative to the other component edges of the fuel cell, such as the catalyst layers, so as provide the functionality required to extend the ionomer membrane life and prevent damage to the ionomer membrane during the assembly process.

20 Claims, 3 Drawing Sheets

MANUFACTURE OF MEMBRANE ELECTRODE ASSEMBLY WITH EDGE PROTECTION FOR PEM FUEL CELLS

FIELD OF THE INVENTION

The present invention relates generally to fuel cells, and more particularly to new and improved methods for constructing membrane electrode assemblies that exhibit enhanced durability.

BACKGROUND OF THE INVENTION

Fuel cells have been used as a power source in many applications. For example, fuel cells have been proposed for use in electrical vehicular power plants to replace internal combustion engines. In proton exchange membrane (PEM)-type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements, sometimes referred to as the gas diffusion media components, that: (1) serve as current collectors for the anode and cathode; (2) contain appropriate openings therein for distributing the fuel cell's gaseous reactants over the surfaces of the respective anode and cathode catalysts; (3) remove product water vapor or liquid water from electrode to flow field channels; (4) are thermally conductive for heat rejection; and (5) have mechanical strength. The term fuel cell is typically used to refer to either a single cell or a plurality of cells (e.g., a stack) depending on the context. A plurality of individual cells are commonly bundled together to form a fuel cell stack and are commonly arranged in series. Each cell within the stack comprises the MEA described earlier, and each such MEA provides its increment of voltage.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

Examples of technology related to PEM and other related types of fuel cell systems can be found with reference to commonly-assigned U.S. Pat. No. 3,985,578 to Witherspoon et al.; U.S. Pat. No. 5,272,017 to Swathirajan et al.; U.S. Pat. No. 5,624,769 to Li et al.; U.S. Pat. No. 5,776,624 to Neutzler; U.S. Pat. No. 6,103,409 to DiPierno Bosco et al.; U.S. Pat. No. 6,277,513 to Swathirajan et al.; U.S. Pat. No. 6,350,539 to Woods, III et al.; U.S. Pat. No. 6,372,376 to Fronk et al.; U.S. Pat. No. 6,376,111 to Mathias et al.; U.S. Pat. No. 6,521,381 to Vyas et al.; U.S. Pat. No. 6,524,736 to Sompalli et al.; U.S. Pat. No. 6,528,191 to Senner; U.S. Pat. No. 6,566,004 to Fly et al.; U.S. Pat. No. 6,630,260 to Forte et al.; U.S. Pat. No. 6,663,994 to Fly et al.; U.S. Pat. No. 6,740,433 to Senner; U.S. Pat. No. 6,777,120 to Nelson et al.; U.S. Pat. No. 6,793,544 to Brady et al.; U.S. Pat. No. 6,794,068 to Rapaport et al.; U.S. Pat. No. 6,811,918 to Blunk et al.; U.S. Pat. No. 6,824,909 to Mathias et al.; U.S. Patent Application Publication Nos. 2004/0229087 to Senner et al.; 2005/0026012 to O'Hara; 2005/0026018 to O'Hara et al.; and 2005/0026523 to O'Hara et al., the entire specifications of all of which are expressly incorporated herein by reference.

A fuel cell subgasket can be used for the following functions: (1) because the ionomer membrane is a soft material that drastically changes dimensions with temperature and relative humidity, subgasket provides a tough and dimensionally stable material (e.g., PET or PEN) to seal regions of the membranes; (2) because the ionomer membrane is soft, the use of a subgasket allows for increased seal loads without damaging the membrane; (3) edges of different components in the PEM fuel cell can cause local stress concentrations on the membrane (e.g., the use of subgaskets can prevent these edges from causing premature membrane failure); and (4) the location of the subgasket edge can be used to control the activity at the catalyst edges (e.g., if the subgasket is impermeable, it can prevent reactants from reaching the catalyst, thus the subgasket edge can control the effective active edge of the catalyst). Significant improvements in MEA life have been demonstrated by artificially controlling catalyst edges using a subgasket.

However, conventional methods of attaching the subgasket to the ionomer membrane have not been completely satisfactory. Various attempts have been made to overcome this problem. For example, some manufacturers have used hot pressure to attach the subgaskets to the ionomer membranes. In addition to the heat and pressure required in the technique, an additional disadvantage is that the catalyst layers are added after the subgasket. This prevents the subgasket from being attached over the catalyst layer. The subgasket can be attached under the catalyst in this method, but this will often lead to catalyst cracking and delaminating at the subgasket edge. This cracking results in a fuzzy catalyst edge at the subgasket edge. In order to offset the anode and cathode catalyst edges, this method requires additional space to account for the uncertainty in the catalyst edge caused by the cracking. Additionally, this method could leave gaps of exposed ionomer membrane between the catalyst and subgasket edges.

Other attempts use an approach where the subgasket is placed on top of the membrane. Then this three layer structure is sandwiched between two pieces of catalyst coated diffusion media. The entire assembly is then hot pressed past the glass transition point of the ionomer to form the MEA. While this approach is fairly robust in terms of controlling catalyst edges it has several disadvantages. First, the heat and pressure required to get the bond can cause the ionomer membrane to flow, which can lead to thinning under the subgaskets. Second, the heat/cool cycles can induce thermal stresses in the part. Failures can then occur at the subgasket edge. Third, because the entire MEA, including the gas diffusion medium (GDM), is assembled in one hot press step, it is very difficult to then inspect the catalyst edge positions.

Accordingly, there exists a need for new and improved methods for attaching the subgasket to the ionomer membrane, wherein the methods provide for the precise location of the subgasket relative to the other component edges of the fuel cell so as provide the functionality required to extend the ionomer membrane life and prevent damage to the ionomer membrane during the assembly process.

SUMMARY OF THE INVENTION

In accordance with a first embodiment, a method for constructing a membrane electrode assembly/subgasket assembly is provided, comprising: (1) providing a subgasket member; (2) providing an adhesive layer on a surface of the subgasket member; (3) forming the subgasket member into a desired configuration, wherein an area defining an aperture is formed in a central area of the surface of subgasket member; (4) securing the subgasket member to a first platen member; (5) providing a catalyst coated membrane member, wherein a catalyst layer is provided in a central area of the membrane member, wherein the catalyst layer includes an edge configuration substantially identical to an edge configuration of the aperture; (6) securing the catalyst coated membrane member to a second platen member; and (7) manipulating the first and second platen members so that the adhesive layer contacts the membrane member of the catalyst coated membrane member.

In accordance with a first alternative embodiment, a method for constructing a membrane electrode assembly/subgasket assembly is provided, comprising: (1) providing a subgasket member; (2) providing an adhesive layer on a surface of the subgasket member; (3) forming the subgasket member into a desired configuration, wherein an area defining an aperture is formed in a central area of the surface of subgasket member; (4) securing the subgasket member to a first platen member with a vacuum force, wherein the adhesive layer is spaced and opposed from the first platen member; (5) providing a catalyst coated membrane member, wherein a catalyst layer is provided in a central area of the membrane member, wherein the catalyst layer includes an edge configuration substantially identical to an hedge configuration of the aperture; (6) securing the catalyst coated membrane member to a second platen member with a vacuum force, wherein the catalyst layer is spaced and opposed from the second platen member; and (7) manipulating the first and second platen members so that the adhesive layer contacts the membrane member of the catalyst coated membrane member, wherein the catalyst layer is operable to overlap a portion of the adhesive layer or the subgasket member.

In accordance with a second alternative embodiment, a method for constructing a membrane electrode assembly/subgasket assembly is provided, comprising: (1) providing a subgasket member; (2) providing an pressure sensitive adhesive layer on a surface of the subgasket member; (3) forming the subgasket member into a desired configuration, wherein an area defining an aperture is formed in a central area of the surface of subgasket member; (4) securing the subgasket member to a first platen member with a vacuum force, wherein the adhesive layer is spaced and opposed from the first platen member; (5) providing a catalyst coated ionomer membrane member, wherein a catalyst layer is provided in a central area of the ionomer membrane member, wherein the catalyst layer includes an edge configuration substantially identical to an edge configuration of the aperture; (6) securing the catalyst coated ionomer membrane member to a second platen member with a vacuum force, wherein the catalyst layer is spaced and opposed from the second platen member; (7) aligning a first location datum of the edge configuration of the catalyst layer with a first location datum of the edge configuration of the aperture; and (8) manipulating the first and second platen members so that the adhesive layer contacts the ionomer membrane member of the catalyst coated ionomer membrane member, wherein the catalyst layer is operable to overlap a portion of the adhesive layer or the subgasket member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

The following description of the preferred embodiment(s) is merely exemplary in nature and is in no way intended to limit the invention, its application, or uses.

Figure 1:
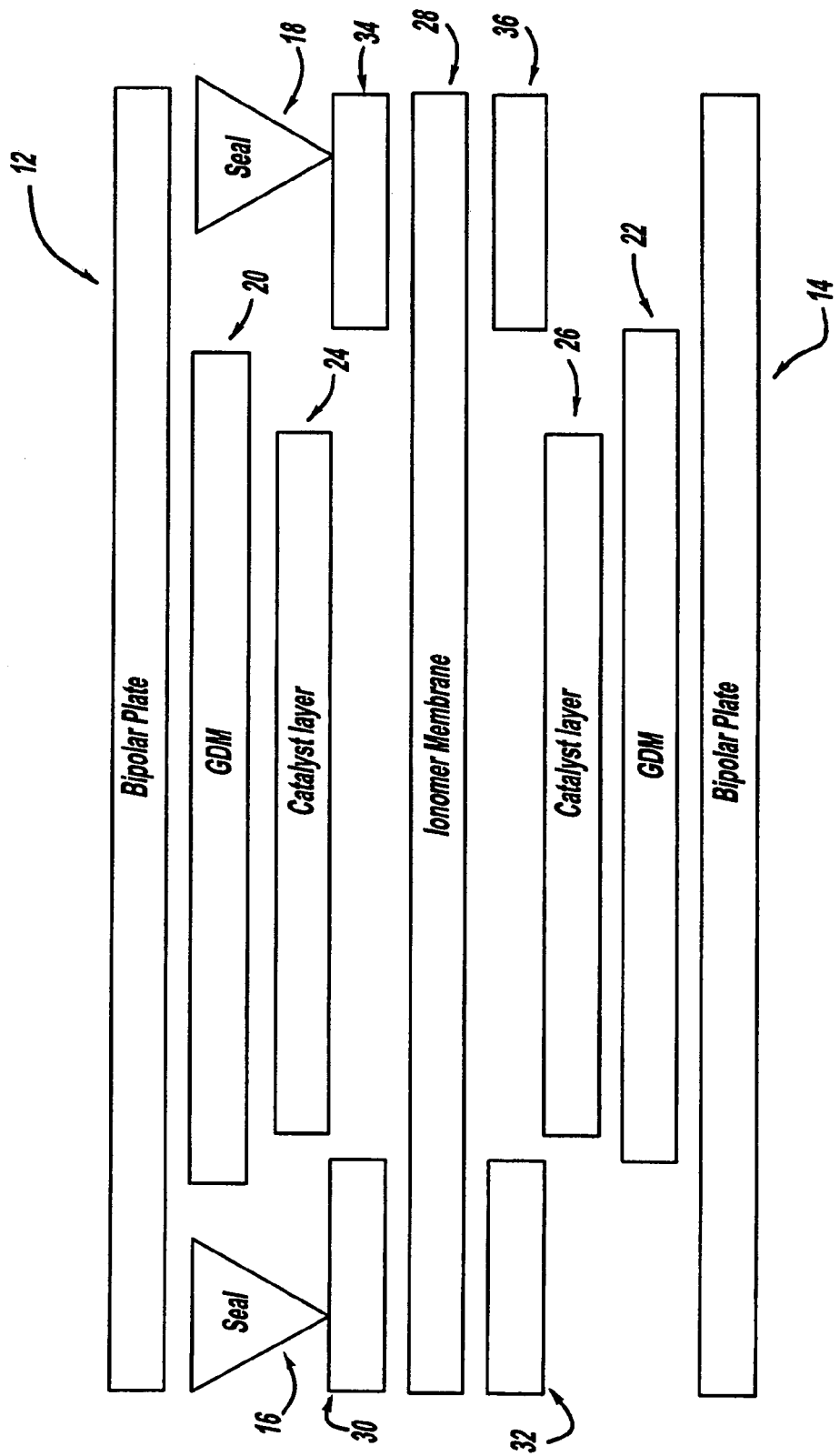
FIG. 1 is an exploded view of a conventional PEM fuel cell, in accordance with the prior art.

A typical PEM fuel cell 10, e.g., as shown in FIG. 1, is composed of a pair of spaced and opposed bipolar plates, 12, 14, respectively, a pair of spaced and opposed seals, 16, 18, respectively, two spaced and opposed gas diffusion medium layers 20, 22, respectively, two spaced and opposed catalyst layers, 24, 26, respectively, an ionomer membrane 28, and optionally, some type of subgasket material 30, 32, 34, 36, respectively. As noted, the subgasket is optional and can appear on one or both sides of the ionomer membrane 28. The location of the subgasket relative to the ionomer membrane 28 edges and the catalyst layers 24, 26, respectively, edges is also variable depending on the function of the subgaskets.

The present invention primarily relates to methods for attaching a subgasket to an ionomer membrane. These methods allow for precise location of the subgasket relative to other component edges to create the functionality required to extend membrane life. Additionally, this assembly method eliminates processing methods that are common practice in the industry which have the potential to damage the membrane.

MEA's are commercially available from several companies in different forms. They can be purchased in the following forms: catalyst coated membranes (CCM); CCM's with subgaskets; and MEA laminates made from catalyst coated diffusion media (CCDM). In all of these cases, manufacturers are limited in subgasket placement opportunities and often do not understand the importance of placement for edge protection. The present invention allows for modification of standard MEA configurations with precisely located subgaskets to extend the life of the part.

The present invention proposes that by controlling the relative position of the anode catalyst edge to the cathode catalyst edge, chemical degradation of the ionomer membrane at the catalyst edge can be substantially reduced. Edge failures are typically the first failure point seen in a well-running PEM fuel cell. By reducing or eliminating edge failures, up to 300% improvement in overall MEA life can be achieved. While there are several methods for controlling these catalyst edges relative to each other, the present invention deals primarily with the precise placement of an impermeable subgasket over one or both of the catalyst layer edges.

By way of a non-limiting example, the subgasket can either be attached to the membrane underneath the catalyst, as in the case of a CCDM-MEA construction, or the subgasket can be attached to the membrane extending over the catalyst in the case of a CCM-MEA construction. In either case, controlling the location of the subgasket edge relative to the catalyst layer edge is critical. Any variation in the ability to locate the subgasket will lead to an increased area of subgasket/catalyst overlap to ensure that the edge is properly controlled to the design constraint. Because the most common catalyst in PEM fuel cells is platinum, reducing the area of inactive catalyst is crucial from a cost perspective. Additionally, increased tolerances in subgasket location will adversely affect the fuel cell's power density as the inactive area will grow with increased subgasket overlap.

In accordance with the general teachings of the present invention, there are several different methods to bond the subgasket to the MEA: (1) hot melt the subgasket to the ionomer and catalyst using a thermoset adhesive; (2) use of a room temperature pressure sensitive adhesive (PSA); and (3) loose lay the subgasket into the cell at the time of the fuel stack build. In this case, the subgasket is not bonded to the membrane and/or catalyst layer using an adhesive, but rather is held into place from the compression forces generated by the GDM and seal interfaces to the subgasket.

The first method has several advantages and is industry standard by most MEA manufactures that use subgaskets. The bond between the ionomer membrane and the subgasket is robust and usually allows for a very low defect rate. However, this method also has a serious disadvantage. This type of bonding requires heating the ionomer membrane, usually past the glass transition point of the material. This can lead to ionomer membrane flow away from the high pressure areas, resulting in membrane thinning under the subgaskets. Additionally, the heat addition required by this process will cause the ionomer membrane to change shape during the heat/cool cycle. Once the subgasket is bonded to the hot membrane, it is rigidly held in place. When the MEA is cooled, stresses are introduced into the part. Both the thinning and increased stresses can lead to premature membrane failure.

The second assembly method has the advantage of room temperature processing. Furthermore, the right adhesives can achieve a good bond with minimal pressure being applied to the subgasket and membrane. The disadvantage to using a room temperature PSA is that THAT the subgasket to membrane location has to precise when the parts come into contact with each other. Additionally, the parts must be flat to avoid wrinkles and any misalignment will not be correctable.

The third assembly method can avoid the membrane thinning and the thermal stresses associated with the first assembly method. Additionally, it does not require the precise tooling required in the second assembly method. However, this method is not practical in large volumes and is a tedious process. It requires that each MEA be assembled at the time of build. The additional tooling required to support either the first or second assembly methods will reduce overall assembly time and ensure better control.

The present invention focuses on using the second assembly method; however, the alignment tooling is modified to accommodate a hot press with precise alignment, if necessary.

The present invention will focus primarily on the assembly of a subgasketed MEA that starts with a CCM. However, the same benefits from the assembly process and tooling can be applied to a CCDM-MEA with slight modifications.

In accordance with one aspect of the present invention, the first step in the assembly process can commence with procuring a roll of the desired subgasket material. The material should be impermeable to reactants and should not degrade in a fuel cell environment (e.g., typically either PEN or PET). It is preferred that the material has a PSA on one side with a backing layer. If the roll of subgasket material does not come with a PSA, then it should be coated with a transfer tape prior to assembly. Additionally, the PSA could be applied by a silkscreen process, or the like.

Acceptable PSAs can either be silicone-based or acrylic, with acrylic being preferred. The selected adhesive should not degrade in the fuel cell environment and should be free of contaminants that may leach into the active area of the MEA. It is also preferred that the adhesive is as thin as possible. For example, thinner adhesives are less likely to flow into the active area of the MEA. Additionally, thinner adhesives will reduce any compression related stresses on the MEA when it is assembled in the fuel cell stack.

Thinner subgaskets are also preferred. Like the adhesive, thinner subgaskets typically limit stress concentrations when compressed in a fuel cell stack. Thinner subgaskets are also easier to cut in the assembly process. However, thinner subgaskets make part handling and assembly more difficult.

Figure 2:
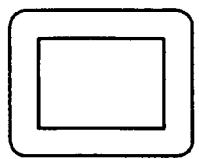
FIG. 2 is a schematic view of a subgasket member with an active area window provided therein, in accordance with a first embodiment of the present invention.

The next step is to die cut the desired subgasket footprint from the parent material roll. At the same time, the die should cut a window in the subgasket that will define the active area of the MEA, as shown in FIG. 2. It should be appreciated that the PSA could be applied to the subgasket after, rather than before the window is cut therein. For example, after the window has been cut from the subgasket, the PSA could be applied to the subgasket in the area adjacent to the window (e.g., around the perimeter of the window, e.g., around a ⅛ inch margin around the perimeter of the window) by any number of techniques, including but not limited to silk-screening or the like.

Figure 3:
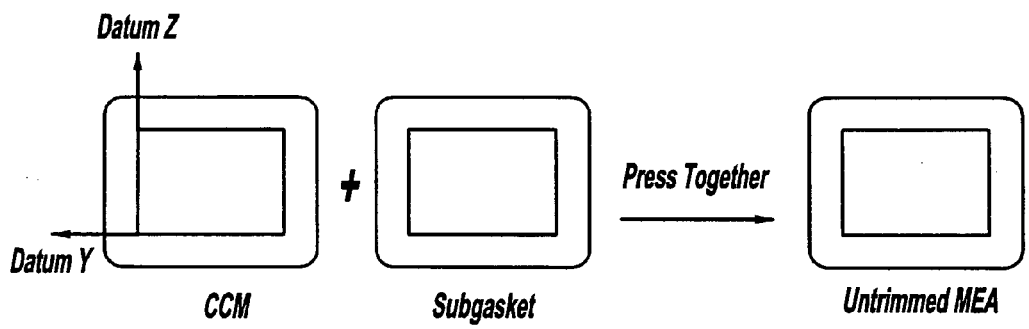
FIG. 3 is a schematic view of a processing step for forming an untrimmed MEA member, in accordance with a first alternative embodiment of the present invention.

The next step is to align the CCM with the assembly platen using the outer catalyst edge as datums. For example, the manufacturer could align the subgasket part on another assembly platen using the active area window as an alignment feature. The subgasket parts will have the PSA side opposite of the platen. LEDs or similar light sources can be used to locate the active area window and the catalyst edges on the platens. The platens can use a vacuum force to hold the part flat and rigid. Next, the backing paper is removed from the subgasket part, thus exposing the PSA. The CCM platen and the subgasket platen will then use alignment features so that they are properly aligned to each other. This alignment will be determined, at least in part, by the desired MEA edge architecture. At this point, the subgasket is gently pressed to the CCM, thus creating a subgasketed MEA with precisely aligned catalyst and subgasket edges, as shown in FIG. 3.

Figure 3A:
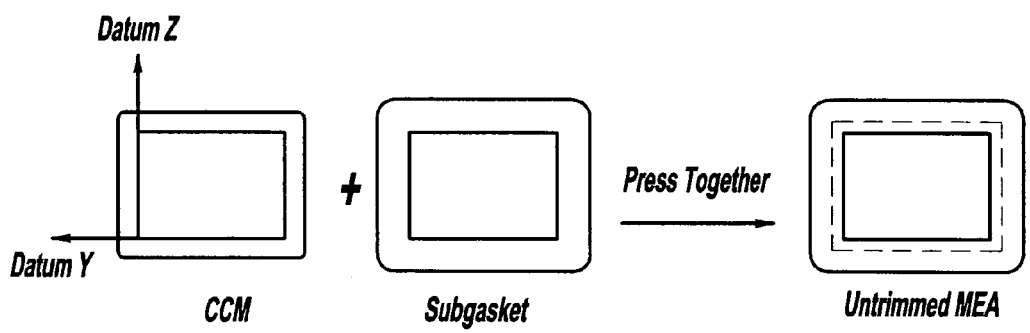

In accordance with another aspect of the present invention, the CCM can be configured so as to be somewhat smaller than the subgasket, e.g., having a size slightly larger than the window formed in the subgasket. In this manner, the material forming the CCM can be conserved, thus reducing manufacturing costs. In this case, the PSA disposed on the subgasket should be placed around the periphery of the window such that the outer periphery (e.g., a ⅛ inch peripheral portion) of the smaller CCM layer contacts the PSA, but does not appreciably extend beyond the PSA layer towards the outer periphery of the subgasket layer, as shown in FIG. 3a.

It should be appreciated that with a one-subgasket assembly, the PSA would need to be applied to the periphery of the window such that the subgasket does not stick to a platen, or other undesirable surface. Additionally, it should be appreciated that for a two-sided subgasket assembly, the PSA would need to be applied on one side to the periphery of the window, but can be applied liberally to the other side of the subgasket so as to allow the two subgaskets to bond together.

At this point, the assembled MEA remains attached to one of the platens by vacuum and the other platen is removed. Because the vacuum has held the MEA in the original position relative to the catalyst area, the datums have been held since established. This is important when trimming the MEA to fit the fuel cell stack application. Using the catalyst or subgasket edges for alignment features when assembly fuel cell stacks is not practical. Therefore, additional locating features are often cut into the MEA to properly align it with the bipolar plate features. This assembly method of the present invention allows minimizing the additional tolerances incurred by switching datum structures.

Figure 4:
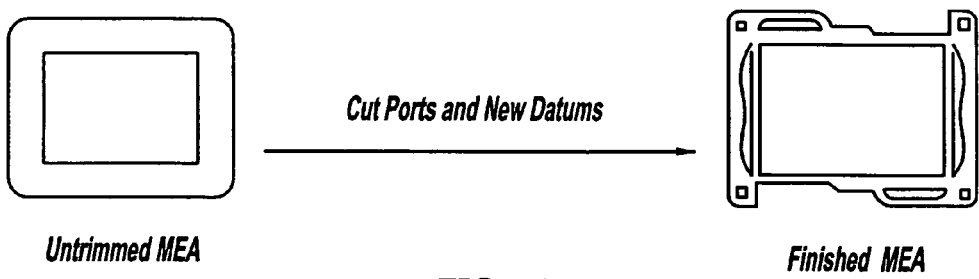
FIG. 4 is a schematic view of a processing step for forming a finished MEA member, in accordance with a second alternative embodiment of the present invention.

While holding the MEA in place, ports and external locating features are cut into the part. By holding the catalyst as the primary datum from start to finish of the process, minimal tolerances can be achieved from catalyst edge to subgasket edge and from catalyst edge to all other fuel cell interfaces, as shown in FIG. 4.

Figure 5:
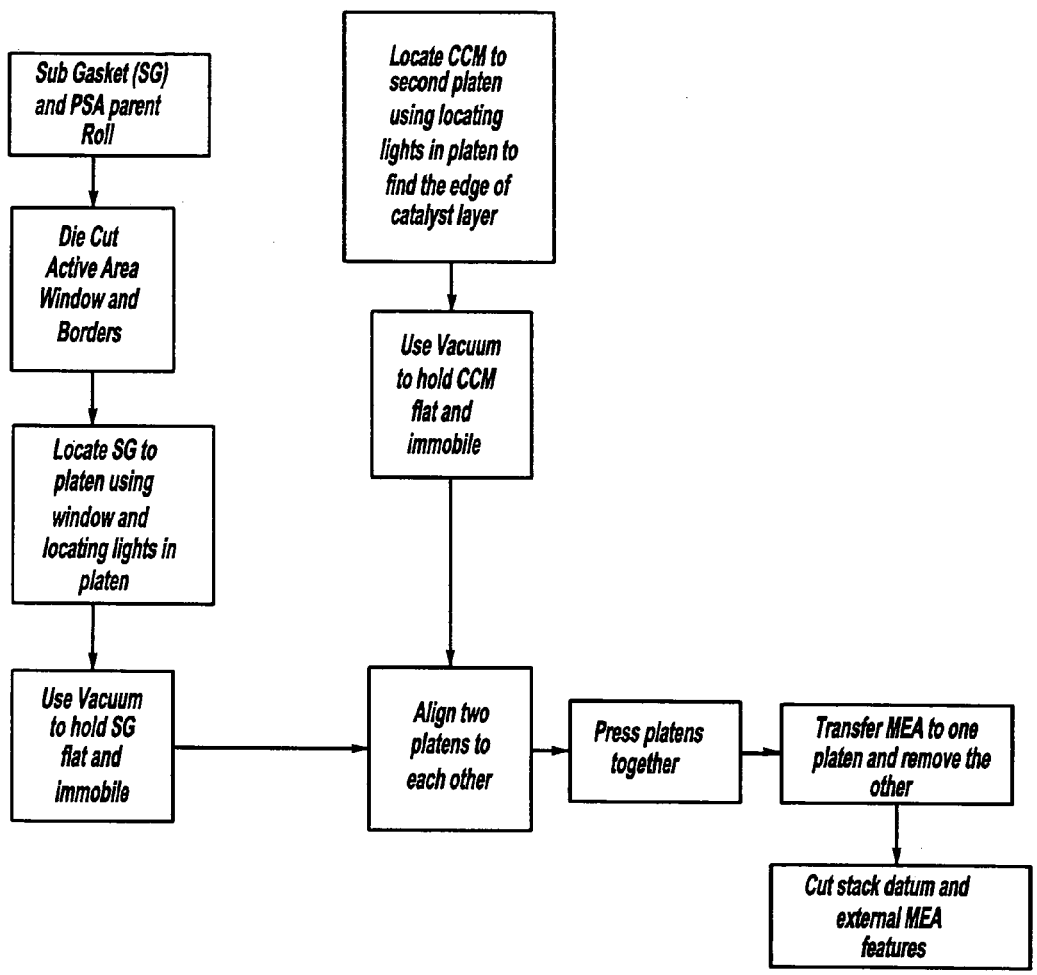
FIG. 5 is a flowchart of the primary processing steps of a process for forming a finished MEA member, in accordance with a third alternative embodiment of the present invention.

Referring to FIG. 5, there is a flowchart presented that outlines the primary processing steps of the assembly method of the present invention, as discussed above.

Some of the benefits of the present invention may include, but are not limited to: (1) ease of fuel cell stack assembly, e.g., subgasket allows for easier part handling, and datums in subgaskets allow to precisely locate key MEA features with key bipolar plate features (e.g., the precise alignment is achieved by establishing the catalyst as a datum and holding throughout the MEA/subgasket assembly process); (2) increased MEA durability, e.g., precisely being able to align the subgasket to desired point on catalyst coated membrane (or establish the active area on the CCDM-MEA) allows to control catalyst edge failures, and using a room temperature PSA allows for the assembly of the subgasket to the MEA without thinning the ionomer membrane, using a room temperature PSA allows for the assembly of the subgasket to the MEA without introducing thermal stresses into the ionomer membrane, thin subgasket and adhesive materials reduce the compression related stresses at the subgasket edge, and the addition of the subgasket, when inside of the GDM edge, prevents GDM fibers from puncturing the ionomer membranes at the GDM edge; (3) increased fuel cell power density, e.g., precisely locating the subgasket edge allows a part designer to reduce the real estate required to locate GDM, catalyst and subgasket edges in the desired relative positions, thus resulting in a smaller part; and (4) decreased MEA costs, e.g., precisely locating the subgasket edge allows for a smaller part (e.g., raw materials are a very large driver in MEA total cost and by reducing the required materials, the net cost decreases).

It should be understood the present invention can be assembled in any number of ways, including but not limited to discrete platen assembly methods, as described herein. It is envisioned that a high roll-to-roll assembly process can be used as well.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for constructing a membrane electrode assembly/subgasket assembly, comprising:
   providing a subgasket member;
   providing an adhesive layer on a surface of the subgasket member;
   forming the subgasket member into a desired configuration, wherein an area defining an aperture is formed in a central area of the surface of subgasket member;
   securing the subgasket member to a first platen member;
   providing a catalyst coated membrane member, wherein a catalyst layer is provided in a central area of the membrane member, said catalyst layer including an edge configuration substantially identical to an edge configuration of the aperture;
   securing the catalyst coated membrane member to a second platen member;
   manipulating the first and second platen members so that the adhesive layer contacts the membrane member of the catalyst coated membrane member and the catalyst layer overlaps a portion of the adhesive layer or the subgasket member; and
   aligning, using a light source, a first location datum of the edge configuration of the catalyst layer with a first location datum of the edge configuration of the aperture.

2. The invention according to claim 1, wherein the adhesive layer is comprised of a pressure sensitive adhesive material.

3. The invention according to claim 1, wherein the membrane member is comprised of an ionomeric material.

4. The invention according to claim 1, wherein the subgasket member is secured to the first platen member with a vacuum force.

5. The invention according to claim 1, wherein the adhesive layer is spaced and opposed from the first platen member.

6. The invention according to claim 1, wherein the catalyst coated membrane member is secured to the second platen member with a vacuum force.

7. The invention according to claim 1, wherein the catalyst layer is spaced and opposed from the second platen member.

8. The invention according to claim 1, further comprising forming an area defining an aperture in a peripheral portion of the subgasket member.

9. The invention according to claim 1, wherein the catalyst coated membrane member has a peripheral configuration smaller than a peripheral configuration of the subgasket member.

10. The invention according to claim 1, wherein the adhesive layer is located adjacent to the aperture of the subgasket member.

11. A method for constructing a membrane electrode assembly/subgasket assembly, comprising:
    providing a subgasket member;
    providing an adhesive layer on a surface of the subgasket member;
    forming the subgasket member into a desired configuration, wherein an area defining an aperture is formed in a central area of the surface of subgasket member;
    securing the subgasket member to a first platen member with a vacuum force, wherein the adhesive layer is spaced and opposed from the first platen member;
    providing a catalyst coated membrane member, wherein a catalyst layer is provided in a central area of the membrane member, said catalyst layer including an edge configuration substantially identical to an edge configuration of the aperture;
    securing the catalyst coated membrane member to a second platen member with a vacuum force, wherein the catalyst layer is spaced and opposed from the second platen member;
    manipulating the first and second platen members so that the adhesive layer contacts the membrane member of the catalyst coated membrane member, wherein the catalyst layer is operable to overlap a portion of the adhesive layer or the subgasket member; and aligning, using a light source, a first location datum of the edge configuration of the catalyst layer with a first location datum of the edge configuration of the aperture.

12. The invention according to claim 11, wherein the adhesive layer is comprised of a pressure sensitive adhesive material.

13. The invention according to claim 11, wherein the membrane member is comprised of an ionomeric material.

14. The invention according to claim 11, further comprising forming an area defining an aperture in a peripheral portion of the subgasket member.

15. The invention according to claim 11, wherein the catalyst coated membrane member has a peripheral configuration smaller than a peripheral configuration of the subgasket member.

16. The invention according to claim 11, wherein the adhesive layer is located adjacent to the aperture of the subgasket member.

17. A method for constructing a membrane electrode assembly/subgasket assembly, comprising:
providing a subgasket member;
providing an pressure sensitive adhesive layer on a surface of the subgasket member;
forming the subgasket member into a desired configuration, wherein an area defining an aperture is formed in a central area of the surface of subgasket member;
securing the subgasket member to a first platen member with a vacuum force, wherein the adhesive layer is spaced and opposed from the first platen member;
providing a catalyst coated ionomer membrane member, wherein a catalyst layer is provided in a central area of the ionomer membrane member, catalyst layer including an edge configuration substantially identical to an edge configuration of the aperture;
securing the catalyst coated ionomer membrane member to a second platen member with a vacuum force, wherein the catalyst layer is spaced and opposed from the second platen member;
aligning, using a light source, a first location datum of the edge configuration of the catalyst layer with a first location datum of the edge configuration of the aperture; and
manipulating the first and second platen members so that the adhesive layer contacts the ionomer membrane member of the catalyst coated ionomer membrane member, wherein the catalyst layer is operable to overlap a portion of the adhesive layer or the subgasket member.

18. The invention according to claim 17, further comprising forming an area defining an aperture in a peripheral portion of the subgasket member.

19. The invention according to claim 17, wherein the catalyst coated membrane member has a peripheral configuration smaller than a peripheral configuration of the subgasket member.

20. The invention according to claim 17, wherein the adhesive layer is located adjacent to the aperture of the subgasket member.

* * * * *